United States Patent [19]

Kegley

[11] Patent Number: 5,719,226
[45] Date of Patent: Feb. 17, 1998

[54] LOW VISCOSITY HOT MELT DISPOSABLES ADHESIVE COMPOSITION

[75] Inventor: Larry McArthur Kegley, League City, Tex.

[73] Assignee: Shell Oil Company, Houston, Tex.

[21] Appl. No.: 697,804

[22] Filed: Aug. 30, 1996

Related U.S. Application Data

[60] Provisional application No. 60/003,853, Sep. 15, 1995.
[51] Int. Cl.$^6$ .................................................. C08L 53/02
[52] U.S. Cl. .......................... 524/505; 525/98; 525/99; 527/271; 527/274
[58] Field of Search ........................ 524/271, 274, 524/505; 525/98, 99

[56] References Cited

U.S. PATENT DOCUMENTS

| | | | |
|---|---|---|---|
| H1622 | 12/1996 | Himes . | |
| 3,519,585 | 7/1970 | Miller | 524/271 |
| 4,080,348 | 3/1978 | Korpman | 524/505 |
| 4,136,071 | 1/1979 | Korpman | 524/274 |
| 4,325,770 | 4/1982 | Korpman | 524/274 |
| 5,093,406 | 3/1992 | Lossner | 524/274 |
| 5,118,762 | 6/1992 | Chin | 525/98 |
| 5,274,036 | 12/1993 | Korpman et al. | 525/92 |
| 5,290,842 | 3/1994 | Sasaki et al. . | |
| 5,331,038 | 7/1994 | Dillman | 525/98 |
| 5,412,032 | 5/1995 | Hansen et al. | 525/99 |
| 5,439,963 | 8/1995 | Korpman | 524/271 |

FOREIGN PATENT DOCUMENTS

| | | |
|---|---|---|
| 93/23488 | 11/1993 | WIPO . |
| 95/11130 | 4/1995 | WIPO . |

OTHER PUBLICATIONS

International Search Report 5 Feb. 1997.

*Primary Examiner*—Peter A. Szekely
*Attorney, Agent, or Firm*—Donald F. Haas

[57] ABSTRACT

The present invention provides a low viscosity, hot melt adhesive composition which is especially suited for use in disposables and is comprised of a) 100 parts by weight of a blend of i) a styrene-diene triblock copolymer, hydrogenated or unhydrogenated, having a weight average molecular weight of 30,000 to 175,000 and a polystyrene content of from 10 to 40% by weight, and ii) an unhydrogenated styrene-isoprene diblock copolymer having a weight average molecular weight of 10,000 to 30,000 and a polystyrene content of from 10 to 40% by weight, wherein the diblock copolymer comprises from 60 to 95% by weight of the blend, and b) 100 to 275 parts by weight of a tackifying resin which is compatible with the diene blocks.

In its preferred embodiment, the invention is the use of SI diblock polymer with a much smaller amount of conventional SEBS or SEPS triblock polymer to produce an extremely low viscosity product which can be processed in the type of equipment presently in use by disposables manufacturers and to be used in disposables assembly applications.

7 Claims, No Drawings

LOW VISCOSITY HOT MELT DISPOSABLES ADHESIVE COMPOSITION

CROSSREFERENCE TO RELATED APPLICATIONS

This application claims the benefit of U.S. provisional application Ser. No. 60/003,853, filed Sep. 15, 1995.

1. Field of the Invention

The invention described herein relates to hot melt adhesive compositions which have a low enough viscosity so that they can be applied without a solvent. More particularly, the invention relates to hot melt assembly adhesive compositions, especially adhesive compositions for assembly of disposable products.

2. Background of the Invention

Block copolymers have been employed in adhesive compositions for many years, primarily because of their high cohesive strengths and their ability to phase separate and form physical associations which act as crosslinks which are normally formed by chemical vulcanization. Block copolymers such as those described in U.S. Pat. No. 3,239,478 are either linear or multiarm including radial or star styrene-butadiene-styrene (SBS) or styrene-isoprene-styrene (SIS) block copolymers. These polymers generally have high cohesive strength and can be readily tackified to yield good adhesive properties.

The use of many of these polymers in certain applications is limited because the viscosities of the polymers are too high for processing at relatively low temperatures (less than 350° F.). One solution to this problem has been to make the main polymer with a high percentage of uncoupled diblock arms, the molecular weights of which have been one half or higher of the molecular weight of the triblock polymer. Another solution was to add a separate diblock which had a high molecular weight (because no low molecular weight diblocks were available until now). This lowers the viscosity somewhat but has the undesirable effect of lowering the tensile strengths of these polymers and adhesives produced with them.

Hot melt adhesives for assembly of disposable products (disposables assembly adhesives), such as disposable diapers and feminine care products were first based on atactic polypropylene, polyethylene, and/or ethylene vinyl acetate copolymers. In the 1970's development took place where SIS was used particularly in the leg and waist areas and then also in the chassis assembly. The trend since then has always been toward lower and lower melt viscosity so the hot melt adhesive could be processed at lower temperatures which in turn enables the disposables manufacturer to use thinner film in the disposables to lower the cost and improve the feel or comfort of the product.

The original styrene-diene products were based on KRATON® D-1111 polymer (SIS) which at that time had a higher styrene content than the commercially available 15 percent styrene SIS polymers. Later, higher styrene content polymers such as STEREON® 840 polymer (SBS) and KRATON® D-1122 polymer (branched SBS) were used. The use of these high styrene products was driven by the desire to have a lower melt viscosity and lower processing temperature in disposables assembly. In the past, the lower limit on the operating temperature has been defined by the temperature at which the hot melt adhesive could be applied with sufficiently low viscosity for even and proper application. Such temperatures were in the range of 300° F. to 350° F. The industry would like to operate at from about 250° F. to about 300° F. That trend continues and has become particularly important in the Japanese market where the need for lower melt viscosity adhesives for disposables assembly is combined with the strong preference for hydrogenated polymers (SEBS and SEPS, where EB is a hydrogenated butadiene block and EP is a hydrogenated isoprene block) because of their increased stability and resistance to heat and oxidation.

Thus, it is clear that there is a need for a hot melt adhesive which is characterized by sufficiently low viscosity for proper application in disposables manufacture at these lower temperatures to help prevent burn through of the thinner gauge polyethylene used in the new disposables assemblies. The adhesive must have as low a viscosity as possible while still maintaining adequate tensile and adhesive properties. The present invention provides such a formulation which can also be made from hydrogenated polymers to take advantage of the advantageous properties of such polymers.

SUMMARY OF THE INVENTION

The present invention provides a low viscosity disposables adhesive composition which is comprised of a) 100 parts by weight (pbw) of a blend of i) a styrene-diene triblock copolymer, hydrogenated or unhydrogenated, having a weight average molecular weight of 30,000 to 175,000 and a polystyrene content of from 10 to 40% by weight, and ii) an unhydrogenated styrene-isoprene diblock copolymer having a weight average molecular weight of 10,000 to 30,000 and a polystyrene content of from 10 to 40% by weight, wherein the diblock copolymer comprises from 60 to 95% by weight of the blend, and b) 100 to 275 parts by weight (pbw) of a tackifying resin which is compatible with the diene blocks (which sometimes are also referred to as the rubber blocks).

This hot melt disposables adhesive composition has sufficient tensile and adhesive properties (i.e., the polyethylene to polyethylene bond is strong enough so that the product will exhibit destructive tear rather than adhesive failure when force is exerted to try and pull the layers apart) to be a good disposables adhesive and its viscosity is low enough (no more than 140 centipoise @ 350° F. in a Brookfield viscometer) so that thin layers of polyethylene can be used in the disposables. In its preferred embodiment, the invention is the use of 80 to 95 parts by weight of low molecular weight SI diblock polymer with a much smaller amount, 5 to 20 parts by weight, of conventional styrene-diene triblock polymer, hydrogenated (SEBS or SEPS) or unhydrogenated (SIS or SBS), and 150 to 250 parts by weight of the tackifying resin described above to produce an extremely low viscosity product which can be processed in the type of equipment presently in use by disposables manufacturers and still has sufficient strength to stand up to the rigors of disposables processing and to function in its intended use after processing.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, or multiarm including star or radial.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention. Polymers containing ethylenic unsaturation and polymers containing both aromatic and ethylenic unsaturation are available commercially from several suppliers.

In general, the polymers of this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

Conjugated dienes which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

The block polymers of the present invention are linear in nature and may be produced by coupling or by sequential polymerization. Sequential polymerization basically involves first anionically polymerizing the A block, then anionically polymerizing the B block on the end thereof, and then anionically polymerizing another A block on the end of that polymer.

In general, the method described is used to prepare coupled polymers with any polymer containing a reactive end group which will react with one or more functional groups contained in the selected coupling agent. The method is particularly suitable for the preparation of coupled polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization.

Three of the most unique features provided by the present invention are:

low levels of triblock can be used and the adhesive still has sufficient strength for this application, the low molecular weight SI diblock can be blended with SEBS or SEPS to form a compatible mixture—this is most surprising because the conventional wisdom in this art wrought from prior experience with the higher molecular weight diblocks that were available in the past teaches that hydrogenated and unhydrogenated polymers of this type are insufficiently compatible to form compatible blends (the tackifying resin is used to help compatibilize these polymers), if the molecular weight is the same, a blend of SI and SEBS or SEPS will have a lower viscosity than a blend of SEB or SEP with SEBS or SEPS but the blend with SI will exhibit the thermal, ultraviolet, and viscosity stability advantages of the hydrogenated triblocks used alone or in combination with hydrogenated diblocks—this is very surprising in that the polymer blend contains at least 85% of unsaturated polymer.

The triblock polymers of the present invention should have a weight average molecular weight of from 30,000 to 175,000 because the tensile strength of the polymer will be insufficient to insure destructive tear rather than adhesive failure if the molecular weight is so low that the styrene block molecular weight is too low to form networks which add strength, or the tack will be insufficient if the styrene content is more than 50% and the viscosity will be too high if the molecular weight is higher than 175,000. The triblock polymers are a minor component of this composition in order to keep the viscosity as low as possible.

The diblock copolymers should have a weight average molecular weight of from 10,000 to 30,000 in order to keep the viscosity low but still have network (domain) formation which imparts sufficient strength to the adhesive. The diblock polymers are a much larger component of the composition because of their affect on the overall viscosity (it gets lower as more diblock is added to the blend. Their concentration may range from 60 to 95% by weight of the total polymer blend, preferably 65 to 90% by weight because this helps to minimize the viscosity and maintain the strength.

Molecular weight is an important variable for the formulator to consider. The minimum amount of diblock which can be used and still have a viscosity of 140 cps or less is lower for polymer blends of lower molecular weight. This gives an adhesive melt viscosity of less than 4000 cps. If the polymers are low in molecular weight, then the viscosity will be lower and less diblock is necessary to meet the viscosity standard. The type of polymer will also have an effect on the operable molecular weight ranges for these polymers. If the triblock and/or the diblock are hydrogenated, then the molecular weight range is lower because of the viscosity limitations—hydrogenated polymers have a higher viscosity than equivalent unhydrogenated polymers. The molecular weight range for hydrogenated triblocks is preferably 20,000 to 60,000 and 10,000 to 30,000 for hydrogenated diblocks. However, if the triblock molecular weight is greater then 125,000, than more diblock must be used in order to meet the viscosity requirement. In this case from 80 to 95% by weight of the diblock is necessary.

If desired, these block copolymers may be hydrogenated to provide the stability advantages characteristic of such polymers to the adhesive composition. Hydrogenation may be effected selectively as disclosed in U.S. Pat. No. Reissue 27,145 which is herein incorporated by reference. The hydrogenation of these copolymers may be carried out by a variety of well established processes including hydrogenation in the presence of such catalysts as Raney Nickel, Noble metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

The preferred combination of triblocks and diblocks for use herein is a hydrogenated triblock polymer such as SEBS or SEPS and the diblock is an unhydrogenated styrene-isoprene (SI) polymer. It is preferred because the diblock lowers the viscosity of the blend but surprisingly there is sufficient triblock, even at 5%, to retain the tensile properties and the stability advantages of the triblock. This diblock should comprise 60 to 95% by weight of the blend, preferably 70 to 95%, and most preferably 80 to 95%.

The unhydrogenated diblock may also be combined with unhydrogenated triblocks such as SBS or SIS. Such blends will not have the weatherability advantages of the preferred blends but they can be used to make good low viscosity disposables adhesives. The diblock content of the blend should be 50 to 95%, preferably 70 to 90%, by weight. Hydrogenated diblocks such as SEB or SEP may be combined with either hydrogenated or unhydrogenated triblocks as well. It is recommended that the diblock content range from 70 to 95%, preferably 75 to 90%, by weight.

An adhesion promoting or tackifying resin that is compatible with the polymers should be used in the amount of from 100 to 275 parts by weight per hundred parts by weight of polymer. In the composition of the present invention, the preferred concentration range of the tackifying resin is narrower, from 150 pbw to 250 pbw, most preferably 175 to 200, because this gives the best balance of viscosity, tack, and adhesion.

There are a wide variety of tackifying resins which are compatible with these polymer blends and thus may be used. Certain tackifiers are chosen depending upon the polymers used and the desire for more compatibility and stability. For example, hydrogenated tackifiers are sometimes more compatible with hydrogenated polymers than are the commonly used unhydrogenated tackifiers and the stability of the formulation increases as the level of unsaturation decreases.

A common tackifying resin is a diene-olefin copolymer of piperylene and 2-methyl-2-butene having a softening point of about 95° C. This resin is available commercially under the trade name Wingtack® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. Softening points of solid resins may be from about 40° C. to about 120° C. Liquid resins, i.e., softening points less than room temperature, may be used as well as combinations of solid and liquid resins.

A composition of the present invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. TuffLo® 6056 and 6204 oil made by Arco and naphthenic process oils, e.g. Shellflex® 371 oil made by Shell. The amounts of rubber compounding oil employed in the invention composition can vary from 0 to 150 phr, preferably form 0 to 80 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition. Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxyphenyl)propionate)methane (Irganox® 1010 from Ciba-Geigy) with tris(nonylphenyl)-phosphite (Polygard® HR from Uniroyal), Irganox® 1010 with bis(2, 4-di-t-butyl)pentaerythritol diphosphite (Ultranox® 626 from Borg-Warner).

All compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive formulation. A formulator skilled in the art will see tremendous versatility in the polymers of this invention to prepare adhesives for disposables.

The adhesive compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

There are several advantages of using lower viscosity polymers in hot melt adhesives. First, the lower viscosity allows for easier processing, lower heating (energy) requirements, lower processing temperatures which results in less degradation of the polymer during processing and allows the formulation to be applied in thinner layers while avoiding the problem of burn through. Finally, and most important here, the polymers of the present invention are especially suitable for disposables adhesives because of their unusual combination of low viscosity, strength, and adhesive properties. They may also be used as heat sealing adhesives since they will heat seal at much lower temperatures than the currently available adhesives.

The resultant adhesives may then preferably be used in a wide variety of disposables assembly applications. One of the most important applications for this adhesive is in the manufacture of disposable diapers although it is also highly advantageous in the manufacture of feminine care products. A particularly preferred application is their use in bonding polyethylene or polypropylene substrates to tissue, non-wovens or other polyethylene or polypropylene substrates using techniques involving multiple dispositions of small quantities of the adhesives according to conventional "multi-line" or "multi-dot" type constructions. Although the procedures used to manufacture these disposable constructions vary depending upon the particular manufacturer, the adhesive is generally extruded in lines (or dots) at regularly spaced intervals along the length of the article. The adhesive may be applied at temperatures as low as 250° F. An additional advantage of the adhesive of the present invention is that it can be effectively applied by spraying. The adhesive is usually applied to the polyethylene or polypropylene backing and subsequently the combination is mated with an absorbent inner core and tissue or non-woven liner.

EXAMPLE

A polymer blend was made with 88% by weight of LIQUID KRATON LVSI 101 polymer, an unhydrogenated 30,000 weight average molecular weight, 15% polystyrene content (PSC) diblock copolymer of styrene and isoprene and the balance KRATON® G1652 polymer, a hydrogenated 50,000 weight average molecular weight, 12% PSC triblock copolymer of styrene and butadiene. 200 parts by weight of the blend of ESCOREZ® 5380, a hydrogenated dicyclopentadiene tackifying resin was added to 100 parts by weight of the blend along with 1 part by weight of IRGANOX® 1010 antioxidant. The blend had a solution viscosity of 84 cps at 350° F. using a Brookfield viscometer.

A 1 mil thick layer of this blend was coated onto a piece of polyethylene film at about 130° to 150° F. A second piece of polyethylene was put on over the top of the blend. Room was left at the edges so that the two layers of polyethylene could be grasped. The construction was heated in an oven to 190° F. and rolled with a one pound pressure roller and then cooled to room temperature. The layers were then grasped by hand and pulled apart. If the layers were to peel along the adhesive, the adhesive would be insufficiently strong. If the polyethylene tore, then destructive tear would have occurred and the adhesive is acceptable. In this case, destructive tear was observed and thus, the adhesive was acceptable.

This experiment proves that the adhesive of this invention will make a good adhesive for disposables. It also proves that the adhesive will bond at as low as 190° F. and would also be a good low temperature heat seal adhesive.

I claim:

1. A hot melt adhesive composition having a viscosity of less than 140 cps at 350° F. comprising:
    a) 100 parts by weight of a blend of i) a styrene-diene triblock copolymer, hydrogenated or unhydrogenated, having a weight average molecular weight of 30,000 to 175,000 and a polystyrene content from 10 to 40% by weight, and ii) an unhydrogenated styrene-isoprene diblock copolymer having a weight average molecular weight of 10,000 to 30,000 and a polystyrene content of from 10 to 40% by weight, wherein the diblock copolymer comprises from 60 to 95% by weight of the blend, and
    b) 100 to 275 parts by weight of a tackifying resin which is compatible with the diene blocks.

2. The adhesive of claim 1 wherein the triblock is a hydrogenated block copolymer of styrene and either butadiene or isoprene and has a molecular weight of 30,000 to 125,000.

3. The adhesive of claim 2 wherein the amount of diblock in the polymer blend ranges from 70 to 95% by weight of the blend.

4. The adhesive of claim 1 wherein the triblock is a hydrogenated block copolymer of styrene and either butadiene or isoprene and has a molecular weight of greater than 125,000 to 175,000.

5. The adhesive of claim 4 wherein the amount of diblock in the polymer blend ranges from 80 to 95% by weight of the blend.

6. The adhesive of claim 1 wherein the tackifying resin is present in an amount of from 150 to 250 parts by weight.

7. The adhesive of claim 6 wherein the tackifying resin is present in an amount of from 175 to 200 parts by weight.

* * * * *